United States Patent
Gukkenberger et al.

(10) Patent No.: US 8,585,106 B2
(45) Date of Patent: Nov. 19, 2013

(54) ENERGY-ABSORPTION SYSTEM

(75) Inventors: Michael Gukkenberger, Pleinfeld (DE); Norbert Sandner, Fürth (DE); Ralf Kolnsberg, Pförring (DE); Andreas Gund, Weissenburg (DE); Frank Hesse, Treuchtlingen (DE)

(73) Assignee: Faurecia Exteriors GmbH, Weissenburg (DE)

( * ) Notice: Subject to any disclaimer, the term of this patent is extended or adjusted under 35 U.S.C. 154(b) by 0 days.

(21) Appl. No.: 13/522,730

(22) PCT Filed: Feb. 1, 2011

(86) PCT No.: PCT/EP2011/051369
§ 371 (c)(1),
(2), (4) Date: Jul. 18, 2012

(87) PCT Pub. No.: WO2011/092342
PCT Pub. Date: Aug. 4, 2011

(65) Prior Publication Data
US 2012/0286529 A1    Nov. 15, 2012

(30) Foreign Application Priority Data
Feb. 1, 2010    (DE) .................. 10 2010 006 542

(51) Int. Cl.
*B60R 19/22*    (2006.01)

(52) U.S. Cl.
USPC .......................................... 293/109; 293/120

(58) Field of Classification Search
USPC .................. 293/107–110, 120–122, 132, 136
See application file for complete search history.

(56) References Cited

U.S. PATENT DOCUMENTS

| | | | | |
|---|---|---|---|---|
| 4,072,334 A | * | 2/1978 | Seegmiller et al. | 293/110 |
| 4,756,948 A | | 7/1988 | Kuramochi et al. | |
| 5,139,297 A | * | 8/1992 | Carpenter et al. | 293/132 |
| 6,244,638 B1 | * | 6/2001 | Kuczynski et al. | 293/109 |
| 6,308,999 B1 | * | 10/2001 | Tan et al. | 293/109 |

FOREIGN PATENT DOCUMENTS

| | | |
|---|---|---|
| DE | 195 02 307 A1 | 10/1995 |
| DE | 195 40 787 A1 | 5/1997 |
| DE | 196 44 075 A1 | 5/1998 |
| DE | 199 24 617 A1 | 11/2000 |
| EP | 0 254 530 A1 | 1/1988 |
| WO | WO 98/23467 A1 | 6/1998 |

\* cited by examiner

*Primary Examiner* — Dennis Pedder
(74) *Attorney, Agent, or Firm* — Fulbright & Jaworski LLP

(57) ABSTRACT

An energy absorption system for installation between a bumper and a transverse beam of a vehicle has a front soft part that faces the bumper, and a rear hard part that faces the transverse beam. Both the hard and soft parts extend over the width of the vehicle and are interlocked with each other.

20 Claims, 4 Drawing Sheets

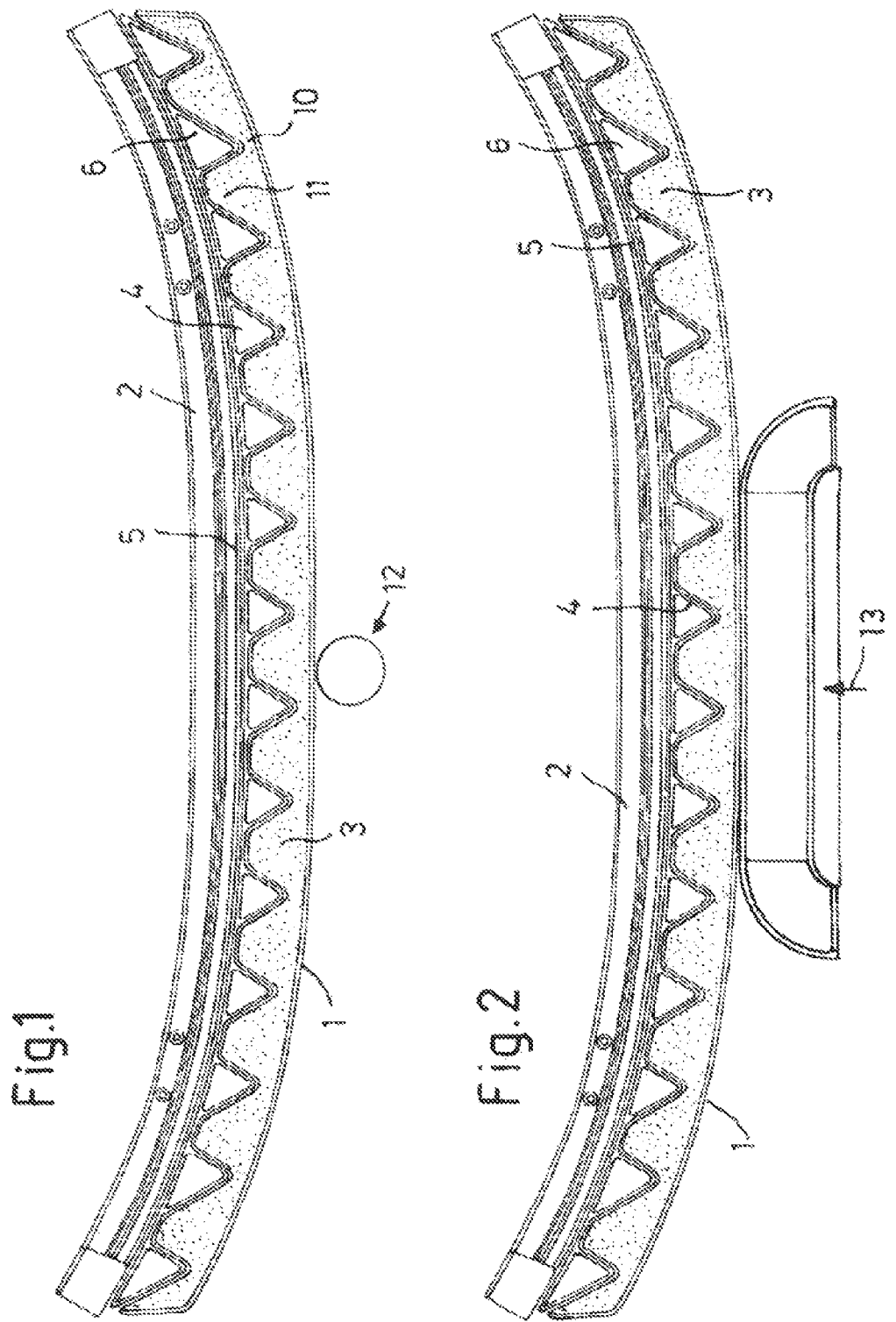

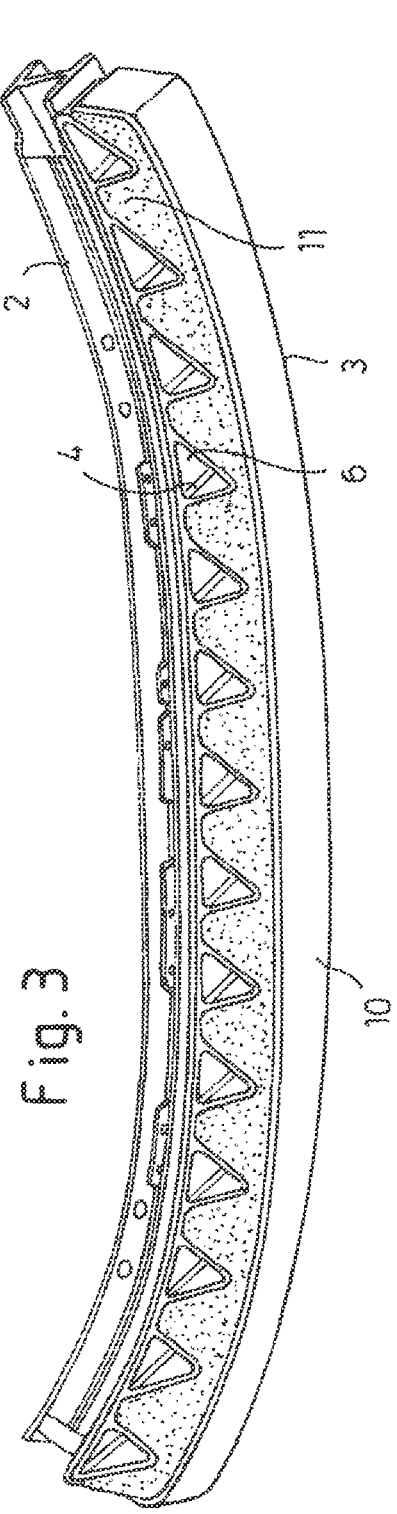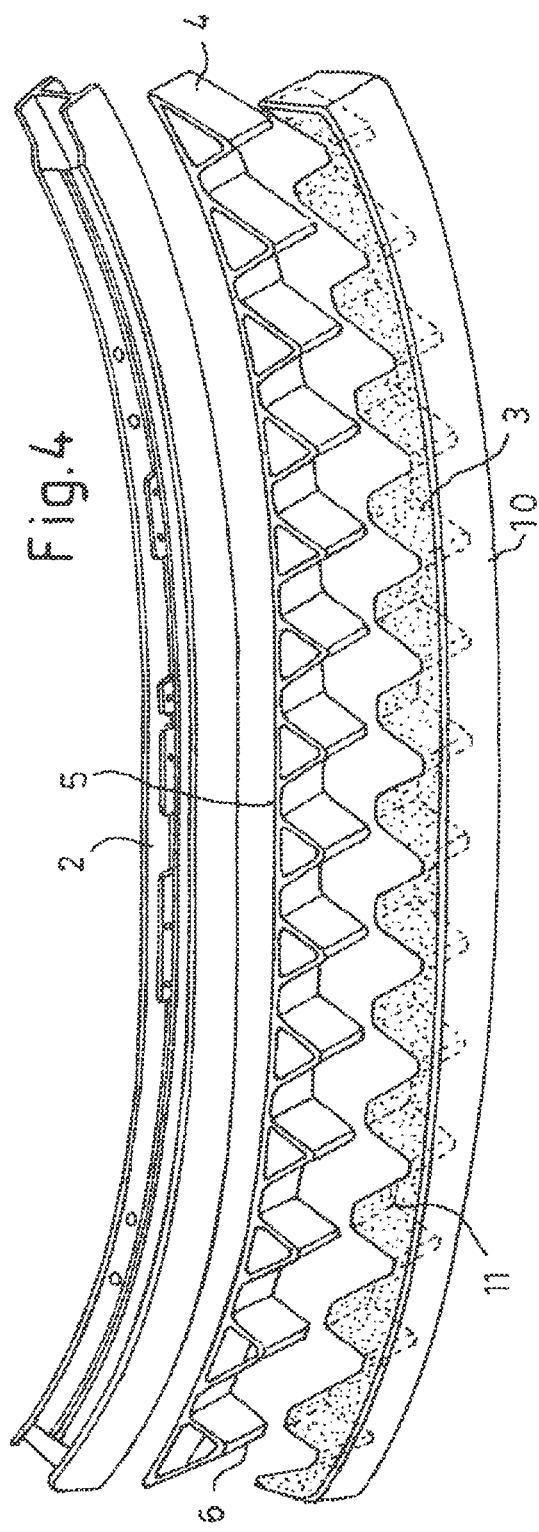

ENERGY-ABSORPTION SYSTEM

Figure 6:
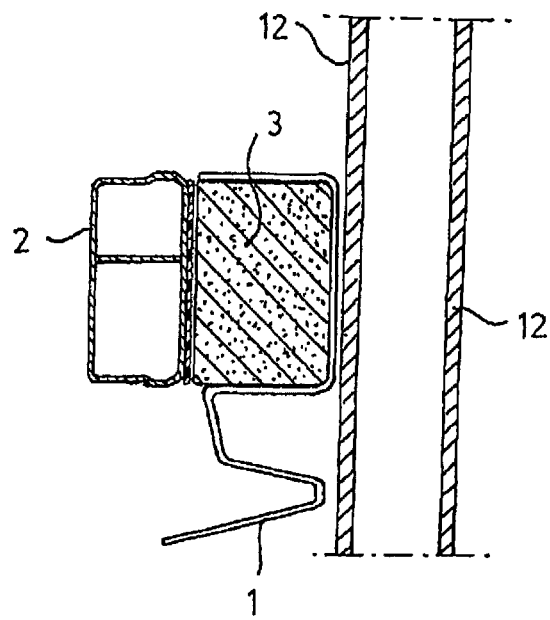

The invention relates to an energy absorption system for installation between bumper and transverse beam of a vehicle.

Different concepts for reducing the crash or impact energy are known which comply with the requirements for pedestrian impacts or with minimizing vehicle damages in the lower speed range (pendulum impacts or low speed damageability).

An energy absorption device for the crash of motor vehicles is known from DE 195 02 307 A1. There, an energy-absorbing deformation element is installed between a bumper and a longitudinal beam. This deformation element comprises a deformation chamber which is bordered by chamber walls and is deformable during a crash of the motor vehicle. The deformation chamber contains a filling of aluminum foam as an energy absorber. Here, the aluminum foam is contained as filling material in the hardened state.

Furthermore, a body lining part for sheet metal support parts for motor vehicles is known (DE 196 44 075 A1), which has a profiled hollow structure which is completely filled with foam. For this purpose, a foamable mass is introduced into the hollow structure and is foamed through energy supply, in particular through high-frequency energy or microwave energy. This foaming process is carried out during the manufacture of the lining part in dependence on a crash situation so that optimal conditions exist either for pedestrian protection or passenger protection.

A similar arrangement is known from DE 195 40 787 A1 where profiled parts as longitudinal beams, transverse beams or crash absorbers made from sheet metal are foamed with an energy-absorbing foam, in particular a PU foam.

From DE 199 24 617 A1, an energy absorption system on a motor vehicle is known which can be adapted to different crash conditions or crash scenarios.

It is an object of the invention to provide an energy absorption system or an impact absorber which fulfills immediately during the crash the requirements for pedestrian protection and also for low speed crashes.

It is a further object of the invention to propose an energy absorption system on a motor vehicle body, which system is attached as an accessory component to the vehicle, and the stiffness of which can be variably adjusted through a suitable geometry, and depending on the crash situation, the stiffness adjusts itself through force deflection.

The invention describes a control-independent energy absorption system (impact absorber) in compliance with the statutory requirements for pedestrian protection and low speed crash (pendulum impact ECE and USA).

Due to the fact that the energy absorption system consists of a front soft part that faces the bumper and acts as a soft component, and of a rear hard part that faces the transverse beam and acts as a hard component, and that the soft part and the hard part each extend over the entire width of the vehicle and both parts are interlocked, an energy absorption system or an impact absorber is created which, in the event of a crash, is compliant with the statutory requirements for pedestrian protection and also for low speed crashes, i.e. compliant with the pendulum impact test ECE and USA. Here, the soft part is responsible for pedestrian protection and the hard part is responsible for low speed crash. Due the interlocking, interaction of the two structural parts is provided, which parts thereby complement each other.

The energy absorption system is two-part construction and consists of a rear structural part, i.e., a hard part as a hard component for high energy absorption, and of a front structural part, i.e., a soft part as a soft component for energy absorption in the event of a pedestrian impact. The energy absorption element functions control- and sensor-independently. Therefore, the energy absorption element does not represent a challenge in terms of process, manufacturing, or cost.

The soft part preferably consists of foam, preferably EPP foam, and the hard part consists of thermoplastic. The energy absorption system is reversible in the soft part due to the foam. The variable stiffness can be adjusted through the geometry of the two structural parts.

In a preferred embodiment, the hard part consists of a support part, wherein on the hard part's side facing the soft part, a multiplicity of individual segments are arranged which are spaced apart from each other at a distance b and project from the support part, and each segment extends vertically over the entire height of the energy absorption system. The segments serve as a hard component and shall divert the applied force or distribute it over a larger area of the support part.

In a preferred embodiment, the segments are triangular in cross-section, wherein a first transverse limb is arranged on the support part and/or is identical therewith in a partial area, and starting from this transverse limb, two distribution limbs extend toward the soft part. Thus, the segments having the triangular cross-section are formed by the transverse limb and the distribution limb. The term "distribution limb" shall express that the distribution limbs distribute the applied force. The term "transverse limb" shall express that said limb extends parallel to the transverse beam.

Advantageously, all three limbs have the same length and in cross-section form an equilateral triangle which is hollow inside. Through this, the leg impactor can slip down on the distribution limbs until it touches the distribution limbs of two adjacent segments. The leg impactor has then penetrated the full depth into the energy absorption system.

For reinforcement, reinforcement ribs can be arranged inside the segments.

Preferably, the distribution limbs are arranged at an angle of 60° to the transverse limb. This angle ensures good energy absorption as well as good slipping.

In one embodiment, the depth a of these segments is in the range of 40-70 mm, preferably in the range between 50-60 mm, and is particularly preferred 57 mm. The depth determines the length of the slipping zone and together with the horizontal distance b of the segments, borders the space for receiving the leg impactor or, respectively, the penetration depth of the leg impactor in the case of pedestrian protection.

Preferably, the segments are arranged on the support part at a distance b of 30-35 mm. This provides sufficient space for the penetrating leg impactor.

Preferably, the soft part consists of a base plate which faces the bumper, and starting from said base plate, impact-absorbing elements 11 extend toward the hard part. These impact-absorbing elements engage in the space between the segments.

For a better stability, the base plate and the impact-absorbing elements are integrally formed and are foamed in one work step.

Preferably, the impact-absorbing elements fill the space between two segments so that the entire space between the segments is utilized for impact absorption.

Preferably, viewed in cross-section, the soft part and the hard part are structural parts having one flat side, with the surface of the soft part facing the bumper and the surface of the hard part facing the transverse beam. Thus, the energy absorption system can be arranged without retrofitting between bumper and transverse beam of a vehicle.

The spacing between these two surfaces and therefore the horizontal depth of the energy absorption system ranges preferably between 70 and 90 mm, and is 80 mm in a preferred embodiment.

The energy absorption system is reversible in its soft part due to the foam. The variable stiffness is given through the geometry of the two structural parts relative to each other. The volume of this two-part energy absorption system is not changed with respect to the conventional systems; i.e., no additional installation space is required.

The energy absorption system is characterized in that the system equally fulfills the statutory ECE and USA requirements with regard to pedestrian impacts and also pendulum impact tests, and no additional sensors for differentiation of the impact situation is necessary.

The function is achieved exclusively through the geometry of the structural parts. The necessary penetration depth for pedestrian protection is achieved through the front structural part, i.e., the soft part.

The energy absorption or stiffness in the case of pendulum impacts is ensured through the interaction of the two structural parts, i.e. of the soft part with the hard part.

The two-part energy absorption system can be installed as an accessory part on the vehicle by means of a simple installation process (e.g. by hinging, clipping-on, gluing). The two structural parts are designed to interact geometrically in such a manner that the applied force is deflected. The connection of the two structural carts can be carried out in a positive locking manner by clipping-on or adhering by means of an adhesive tape.

The arrangement of the crash areas, which meets the requirements for energy absorption, is designed in accordance with the leg impactor. At each point of the test area, the leg impactor can penetrate the full depth into the soft component (soft part) in order to meet the requirements of pedestrian protection. In the case of the pendulum impact, the involved area of the energy absorber is significantly larger. Here, the task is mainly taken on by the hard part, made of a hard component, in interaction with the foam element. The stiffness of the hard part depends on the vehicle weight and can be adapted via an FEM calculation to the crash requirements by adding minerals and glass fibers in the injection molding process and/or by stiffening by means of ribs.

In the case of vehicles with low vehicle weight, the upper part, i.e., the soft part can be dispensed with.

For the fulfillment of these functions, the system does not need any sensors and control electronics.

The energy absorption is vehicle-independent and can be implemented in any vehicle.

The required installation space is preferably specified to be between 80 mm and 100 mm in the X-direction. This is in accordance with today's conditions.

Due to the arrangement of the segments of the hard component with suitably designed angles, it is ensured that the leg impactor can penetrate at any point to the full depth as intended at this point. When the leg impinges on the hard component, the resulting forces are distributed. The leg is always deflected such that the full penetration depth can be utilized. In the event of an impact of a larger obstacle, such as a pendulum, the energy is distributed over a plurality of segments. Here, the foam acts deformation-inhibiting and increases absorption of energy.

Figure 5:
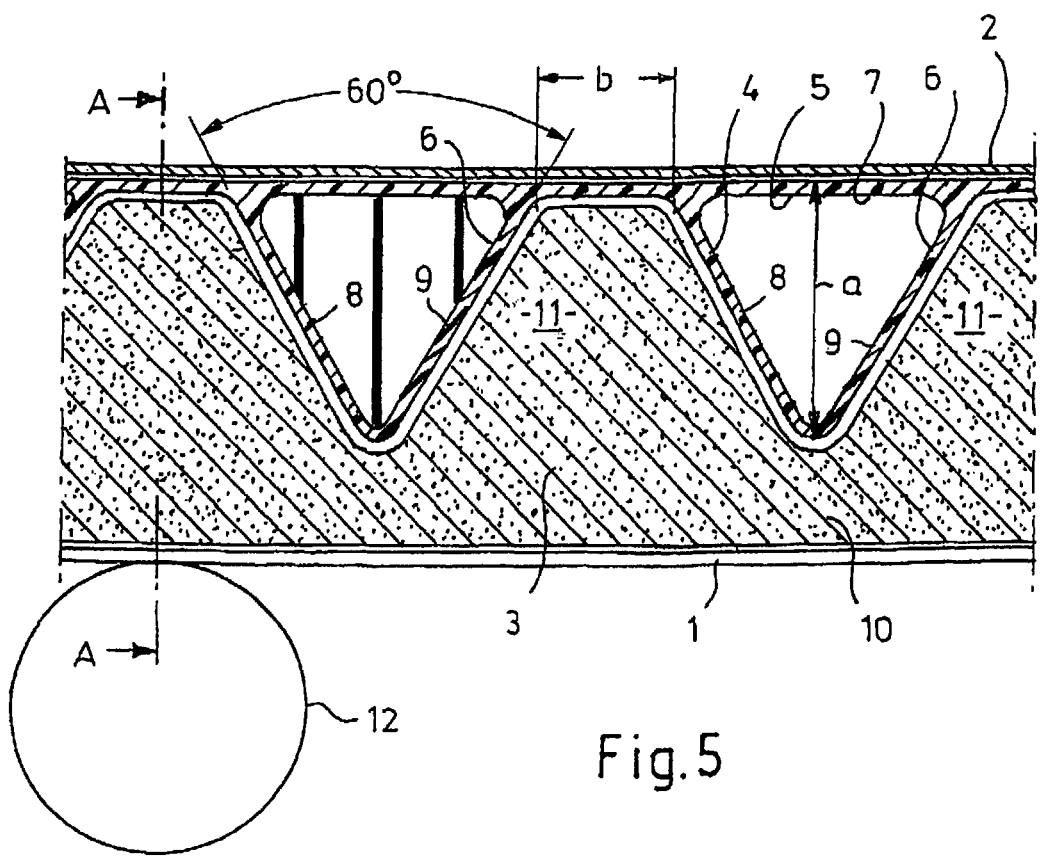
Figure 7:
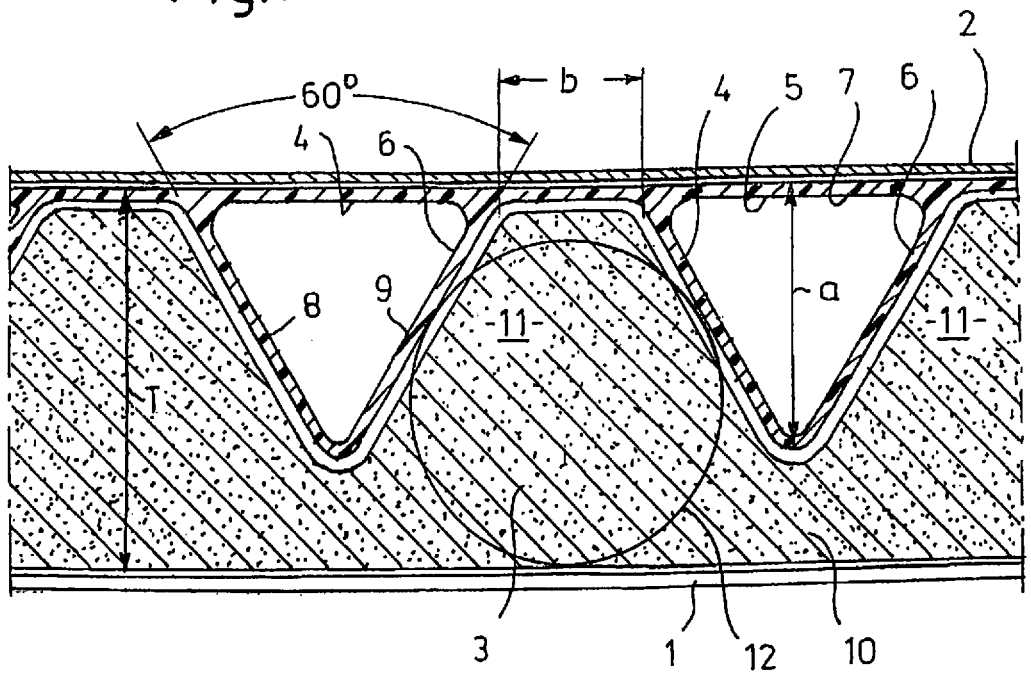
Figure 8:
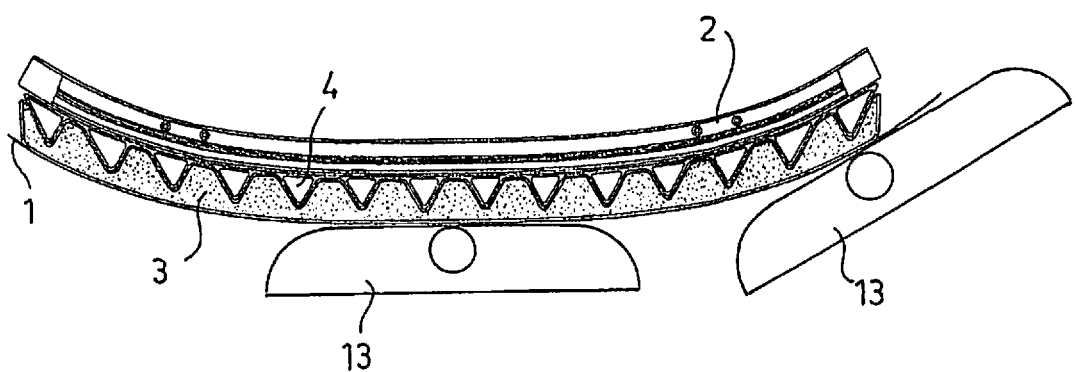

The invention is explained in more detail hereinafter by means of figures. In the figures:

FIG. 1 shows an energy absorption system according to the invention in a cross-section before a transverse beam prior to a crash with a leg impactor, FIG. 2 shows an energy absorption system according to the invention in a cross-section before a transverse beam prior to a crash with a pendulum, FIG. 3 shows a view of an energy absorption system on a transverse beam, FIG. 4 shows the object of FIG. 3 in an exploded view, FIG. 5 shows a section through an energy absorption system between a transverse beam and a bumper, FIG. 6 shows a section according to line A-A of FIG. 5, FIG. 7 shows a section through an energy absorption system between a transverse beam and a bumper, with schematically indicated penetration depth of a leg impactor, and FIG. 8 shows an energy absorption system in a section before a cross beam of a motor vehicle prior to a crash, with a test area for the pendulum impact.

FIG. 1 shows an energy absorption system according to the invention in a section before the transverse beam 2 of a motor vehicle prior to a crash with a leg impactor 12. The energy absorption system is arranged between the bumper 1 and the transverse beam 2 of the vehicle and consists of a front soft part 3 facing the bumper 1 and a rear hard part 4 facing the transverse beam. The soft part 3 adjoining the bumper 1 is configured such that it forms a soft component, and the hard part 4 adjoining the transverse beam 2 is configured as a hard component. The soft part 3 consists of EPP foam and the hard part 4 consists of thermoplastic. Both structural parts 3, 4 are interlocked. Reference number 12 designates a leg impactor 12.

FIG. 2 shows an energy absorption system according to FIG. 1 in a section before a transverse beam 2 of a motor vehicle prior to a crash with a pendulum 13. The energy absorption system is arranged between the bumper 1 and the transverse beam 2 of the vehicle and consists of a front soft part 3 facing the bumper 1 and a rear hard part 4 facing the transverse beam.

FIG. 3 shows a view of an energy absorption system between a bumper 1 and the transverse beam 2 of a vehicle, and FIG. 4 shows the energy absorption system according to FIG. 3 in an exploded illustration. It is clearly shown that the soft part 3 is interlocked with the hard part 4.

FIG. 5 shows a section through an energy absorption system between a transverse beam 2 and a bumper 1. The hard part 4 acting as hard component consists of a support part 5, wherein on the hard part's side facing the soft part 3, a multiplicity of individual segments 6 are arranged which project from the support part 5. These segments 6 are triangular in cross-section, wherein a transverse limb 7 is arranged on the support part 5 or, in this embodiment, is identical with the latter. Starting from this transverse limb 7, two distribution limbs 8, 9 extend toward the soft part 3. All three limbs 7, 8, 9 have the same length and form in cross-section an equilateral triangle. The segments 6 are hollow inside. On the inside, the segments 6 can also comprise reinforcement ribs. The two distribution limbs 8, 9 are arranged at an angle of 60° to the transverse limb 7. In this embodiment, the depth a of these segments 6 is 57 mm. The segments 6 are arranged on the support part 5 at a distance b of 30-35 mm from each other.

The front structural part, i.e., the soft part 3, is configured as a soft component and is interlocked with the rear part, i.e., the hard part 4. The soft part 3 consists of a base plate 10. Starting from this base plate 10, the impact-absorbing elements 11 extend toward the hard part 4. The base plate 10 and the impact-absorbing elements 11 are integrally formed and foamed in one work step. The impact-absorbing elements 11 completely fill up the space between two segments 6. Viewed in cross-section, the soft part 3 and the hard part 4 form a flat structural part 3, 4 with the surface of the soft part 3 facing toward the bumper 1 and the surface of the hard part 4 facing toward the transverse beam 2. The spacing between these two surfaces is the same everywhere and is 80 mm.

It is essential for the function that during a crash of the leg impactor 12 onto the energy absorption system, the leg impactor 12 presses together the impact-absorbing elements 11. When the leg impactor 12 impinges on the two limbs 8, 9, the leg impactor is deflected toward the support part 5 and is thereby also cushioned. The dimensions drawn in the Figures show a preferred embodiment of the energy absorption system.

FIG. 6 shows a section according to line A-A of FIG. 5. Identical reference numbers show identical objects.

FIG. 7 shows a section an energy absorption system according to FIG. 5 between a transverse beam 2 and a bumper 1 with schematically indicated penetration depth of a leg impactor 12. The leg impactor 12 is slipped down on the distribution limbs 8, 9 and is situated therebetween and touches in the end position both distribution limbs 8, 9. The Figure shows only schematically the penetrated leg impactor 12. It is not shown that the leg impactor 12 has pressed together the impact-absorbing elements 11.

FIG. 8 shows an energy absorption system in a section before a transverse beam of a motor vehicle prior to a crash, with a test area for the pendulum impact.

The invention claimed is:

1. An energy absorption system for installation between bumper and transverse beam of a motor vehicle comprising:
   a front soft part that faces the bumper and acts as a soft component; and
   a rear hard part that faces the transverse beam and acts as a hard component,
   wherein the soft part and the hard part each extend over the entire width of the vehicle, and the soft part and the hard part are interlocked,
   wherein the hard part consists of a support part, wherein on the hard part's side facing the soft part, a multiplicity of individual segments are arranged which are spaced apart from each other at a distance (b) and project from the support part, and each segment extends vertically over the entire height of the energy absorption system, and
   wherein the segments are triangular in cross-section, wherein a first transverse limb is arranged on the support part or is identical therewith in a partial area, and starting from this transverse limb, two distribution limbs extend toward the soft part.

2. The energy absorption system according to claim 1, wherein the soft part comprises a foam and the hard part comprises a thermoplastic.

3. The energy absorption system according to claim 1, wherein all three limbs have the same length and in cross-section form an equilateral triangle and are hollow inside.

4. The energy absorption system according to claim 2, wherein all three limbs have the same length and in cross-section form an equilateral triangle and are hollow inside.

5. The energy absorption system according to claim 1, wherein reinforcement ribs are arranged inside the segments.

6. The energy absorption system according to claim 2, wherein reinforcement ribs are arranged inside the segments.

7. The energy absorption system according to claim 3, wherein reinforcement ribs are arranged inside the segments.

8. The energy absorption system according to claim 4, wherein reinforcement ribs are arranged inside the segments.

9. The energy absorption system according to claim 1, wherein the distribution limbs are arranged at an angle of 60° to the transverse limb.

10. The energy absorption system according to claim 2, wherein the distribution limbs are arranged at an angle of 60° to the transverse limb.

11. The energy absorption system according to claim 1, wherein the depth (a) of these segments is in the range of 40-70 mm.

12. The energy absorption system according to claim 11, wherein the depth (a) of these segments is in the range between 50-60 mm.

13. The energy absorption system according to claim 12, wherein the depth (a) of these segments is 57 mm.

14. The energy absorption system according to claim 1, wherein the segments are arranged on a support part at a distance (b) of 30-35 mm from each other.

15. The energy absorption system according to claim 1, wherein the soft part comprises a base plate that faces the bumper, and starting from said base plate, impact-absorbing elements extend toward the hard part and engage in the space between the segments.

16. The energy absorption system according to claim 15, wherein the base plate and the impact-absorbing elements are integrally formed and are foamed in one work step.

17. The energy absorption system according to claim 15, wherein the impact-absorbing elements fill up the space between two segments.

18. The energy absorption element according to claim 1, wherein viewed in cross-section, the soft part and the hard part are structural parts which are flat on one side with a surface of the soft part facing the bumper and a surface of the hard part facing the transverse beam.

19. The energy absorption system according to claim 18, wherein the spacing between these two surfaces is between 70 and 90 mm.

20. The energy absorption system according to claim 19, wherein the spacing between the two surfaces is the same.

* * * * *